United States Patent
Billy et al.

(10) Patent No.: US 11,680,747 B2
(45) Date of Patent: Jun. 20, 2023

(54) METHOD AND INSTALLATION FOR CRYOGENIC SEPARATION OF A GASEOUS MIXTURE BY METHANE SCRUBBING

(71) Applicant: L'Air Liquide, Societe Anonyme pour l'Etude et l'Exploitation des Procedes Georges Claude, Paris (FR)

(72) Inventors: Jean Billy, Le Plessis-Trevise (FR); Axelle Gaertner, Montreuil (FR); Antoine Hernandez, Pontault Combault (FR); Jean-Marc Tsevery, Lieusaint (FR); Marie-Pascal Victor, Paris (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 994 days.

(21) Appl. No.: 16/349,698

(22) PCT Filed: Nov. 16, 2017

(86) PCT No.: PCT/FR2017/053139
§ 371 (c)(1),
(2) Date: May 14, 2019

(87) PCT Pub. No.: WO2018/091831
PCT Pub. Date: May 24, 2018

(65) Prior Publication Data
US 2019/0368810 A1     Dec. 5, 2019

(30) Foreign Application Priority Data
Nov. 18, 2016  (FR) .................................. FR 1661177

(51) Int. Cl.
*F25J 3/02* (2006.01)
*C01B 3/50* (2006.01)

(52) U.S. Cl.
CPC .............. *F25J 3/0223* (2013.01); *C01B 3/506* (2013.01); *F25J 3/0247* (2013.01); *F25J 3/0252* (2013.01);
(Continued)

(58) Field of Classification Search
CPC ........ F25J 3/0223; F25J 3/0233; F25J 3/0271; F25J 3/0252; F25J 3/0261; F25J 2270/02; F25J 2270/24; F25J 2200/76
See application file for complete search history.

(56) References Cited

U.S. PATENT DOCUMENTS

2007/0056319 A1*  3/2007  Billy ...................... F25J 3/0271
                                                          62/620
2010/0043489 A1*  2/2010  Darde .................... F25J 3/0261
                                                          62/631
(Continued)

FOREIGN PATENT DOCUMENTS

| | | |
|---|---|---|
| EP | 1 479 989 | 11/2004 |
| FR | 2 353 819 | 12/1977 |

(Continued)

OTHER PUBLICATIONS

International Search Report and Written Opinion for PCT/FR2017/053139, dated Feb. 13, 2018.

*Primary Examiner* — John F Pettitt, III
(74) *Attorney, Agent, or Firm* — Justin K. Murray

(57) ABSTRACT

In a process for the combined production of a) a hydrogen-enriched gas and a carbon monoxide-enriched gas and/or b) a mixture of hydrogen and carbon monoxide by cryogenic distillation and scrubbing, a still liquor is extracted from a scrubbing column and sent to a stripping column, a still liquor is extracted from the stripping column and sent to a separating column for carbon monoxide and methane and a cooling fluid is used at a pressure greater than that of the (Continued)

head of the separating column for cooling at least one fluid extracted at an intermediate level from the scrubbing column.

11 Claims, 3 Drawing Sheets

(52) U.S. Cl.
CPC ........... *F25J 3/0261* (2013.01); *F25J 3/0271* (2013.01); *F25J 2200/06* (2013.01); *F25J 2200/76* (2013.01); *F25J 2200/90* (2013.01); *F25J 2205/30* (2013.01); *F25J 2230/32* (2013.01); *F25J 2270/04* (2013.01); *F25J 2270/24* (2013.01); *F25J 2290/12* (2013.01)

(56) References Cited

U.S. PATENT DOCUMENTS

| | | | |
|---|---|---|---|
| 2011/0056239 A1* | 3/2011 | Court | F25J 3/0233 62/617 |
| 2018/0251373 A1* | 9/2018 | Fernandez | F25J 3/0271 |

FOREIGN PATENT DOCUMENTS

| | | | | |
|---|---|---|---|---|
| FR | 2942869 A1 * | 9/2010 | | F25J 3/0223 |
| WO | WO-2008087318 A2 * | 7/2008 | | F25J 3/0223 |
| WO | WO-2017144151 A1 * | 8/2017 | | |

* cited by examiner

METHOD AND INSTALLATION FOR CRYOGENIC SEPARATION OF A GASEOUS MIXTURE BY METHANE SCRUBBING

CROSS REFERENCE TO RELATED APPLICATIONS

This application is a § 371 of International PCT Application PCT/FR2017/053139, filed Nov. 16, 2017, which claims the benefit of FR1661177, filed Nov. 18, 2016, both of which are herein incorporated by reference in their entireties.

FIELD OF THE INVENTION

The present invention relates to a process and a plant for the combined production a) of a gas enriched in hydrogen and a gas enriched in carbon monoxide and/or b) a mixture of hydrogen and carbon monoxide and optionally methane by cryogenic distillation and scrubbing. In particular, it relates to a process and an apparatus for the cryogenic separation of a gaseous mixture by methane scrubbing.

BACKGROUND OF THE INVENTION

Units for the production of carbon monoxide and hydrogen can be separated into two parts:
generation of synthesis gas (mixture containing $H_2$, CO, $CH_4$, $CO_2$, Ar and $N_2$ essentially),
purification of synthesis gas. The following are found:
a unit for scrubbing with a liquid solvent in order to remove most of the acid gases present in the synthesis gas,
a unit for purification on a bed of adsorbents,
a unit for cryogenic separation, known as "cold box", for the production of CO or else of $H_2$/CO mixture, known as "oxogas", in which the $CH_4$ and $N_2$ contents are low. The most commonly used process is methane scrubbing.

In the prior art, the separation energy is provided by a CO cycle compressor with a single low pressure cycle level (2.6 bar abs) for cooling the methane scrubbing column and also for cooling the top of the distillation column. The pressure level is defined by the temperature of −182° C. which is the coldest acceptable temperature for cooling the methane scrubbing column to avoid solidification of the $CH_4$. For the purposes of simplifying the CO compressor, use is also made of this temperature level of −182° C. for cooling the top of the CO/$CH_4$ distillation column. This leads to having a high pressure cycle of 28 bar abs in order to be able to condense the CO at the vessel reboiler of the CO/$CH_4$ column.

Thus, in EP1479989, the fluid which has served to cool the intermediate fluids of the scrubbing column is mixed with the top gas of the CO/$CH_4$ distillation column before being sent to the inlet of the cycle compressor producing the product CO. This is possible because the fluid serving for the cooling is at the same pressure as the distillation column. The pressure of the coolant fluid cannot be less than 2.6 bar abs, otherwise there is a risk of the methane circulating in the scrubbing column solidifying. Thus, the CO/$CH_4$ column must operate at at least 2.6 bar and the maximum pressure of the CO cycle is at least 28 bar abs.

Similarly, in FR2353819, the fluid which has served to cool the intermediate fluids is reduced in pressure before being sent to the CO/$CH_4$ column, such that it is mixed with the gas of the CO/$CH_4$ column before being sent to the inlet of the cycle compressor.

In certain cases, the flow rate of the CO compressor is low, which leads to the use of a compressor with piston technology instead of centrifugal technology.

However, the availability of a piston compressor is lower than that of a centrifugal compressor, which may lead to the installation of two piston compressors each with a capacity of 100% in order to be able to continue operation even during the maintenance periods required for piston compressors.

SUMMARY OF THE INVENTION

According to one subject of the invention, a process is provided for the combined production a) of a hydrogen-enriched gas and a carbon monoxide-enriched gas and/or b) a mixture of hydrogen and carbon monoxide and optionally methane by cryogenic distillation and scrubbing, in which:
i) a gaseous mixture containing at least hydrogen, carbon monoxide and methane and optionally nitrogen is cooled in a heat exchanger
ii) the cooled mixture is sent to a scrubbing column
iii) a methane-rich liquid is introduced into the scrubbing column as scrubbing liquid
iv) a hydrogen-enriched gas is drawn off as top gas from the scrubbing column
v) a vessel liquid is drawn off from the scrubbing column and sent to a stripping column
vi) a vessel liquid is drawn off from the stripping column and sent to a column for separating carbon monoxide and methane
vii) at least a portion of the vessel liquid from the separation column constitutes the liquid of step iii), and
viii) a carbon monoxide-rich fluid is used as coolant fluid for cooling at least one fluid drawn off at an intermediate level of the scrubbing column, characterized in that the fluid serving to cool the at least one fluid drawn off at an intermediate level of the scrubbing column is at a greater pressure than that of the top of the separation column, preferably by at least 0.5 bar, or even at least 0.9 bar, and in that the fluid having served to cool the at least one fluid drawn off at an intermediate level of the scrubbing column is sent to an intermediate level of a centrifugal compressor in order to be compressed therein.

According to other optional subjects of the invention:
the fluid serving to cool at least one fluid drawn off at an intermediate level of the scrubbing column is drawn off from the top of the separation column or from a volume located at the top of the separation column, and/or a carbon monoxide-enriched gas originating from the separation column is compressed to form carbon monoxide at a higher pressure, and at least a portion of the carbon monoxide at higher pressure is reduced in pressure to form the coolant fluid.

liquid from the volume located at the top of the separation column is reduced in pressure and sent to the separation column.

the pressure difference between the fluid serving to cool at least one fluid drawn off from an intermediate level of the scrubbing column and that of the top of the separation column is at least 0.5 bar, or even at least 0.9 bar.

a portion of the vessel liquid from the separation column is recovered as methane-rich product in liquid form or in gaseous form, after having vaporized it in the heat exchanger.

a carbon monoxide-enriched fluid is produced from the separation column, and is mixed with the hydrogen-enriched fluid to form a product.

a carbon monoxide-enriched gas heats the vessel of the stripping column and/or the vessel of the separation column and is sent to the top volume after reduction in pressure in a valve.

the separation column is operated at 1.6 bar.

at least a portion of the carbon monoxide-rich liquid from the volume located at the top of the separation column is reduced in pressure and sent to the top of the separation column to be vaporized on contact with the vapor rising inside the column and is subsequently mixed with a portion of the top gas of the separation column.

the fluid having served to cool at least one fluid drawn off at an intermediate level of the scrubbing column is not sent to be separated in the separation column.

a carbon monoxide cycle is used to heat the vessels of the stripping column and of the separation column and to cool the top of the separation column, the centrifugal compressor serving to compress the cycle gas.

the maximum cycle pressure of the carbon monoxide cycle is less than 28 bar.

the maximum pressure of the carbon monoxide cycle is 22 bar.

a gas from the top of the separation column or from a volume at the top of the separation column is sent to the inlet of the compressor.

According to another subject of the invention, a plant is provided for the combined production a) of a hydrogen-enriched gas and a carbon monoxide-enriched gas and/or b) a mixture of hydrogen and carbon monoxide and optionally methane by cryogenic distillation and scrubbing, comprising a centrifugal compressor, a first heat exchanger, a scrubbing column, a stripping column, a column for separating carbon monoxide and methane, a pipe for sending a gaseous mixture containing at least hydrogen, carbon monoxide and methane to cool in the first heat exchanger, a pipe for sending the cooled liquid from the first heat exchanger to the scrubbing column, a pipe for introducing a methane-rich liquid at the top of the scrubbing column as first scrubbing liquid, a pipe for drawing off a hydrogen-enriched gas as top gas of the scrubbing column, a pipe for drawing off a vessel liquid from the scrubbing column and for sending the vessel liquid of the scrubbing column to the stripping column, a pipe for drawing off a vessel liquid from the stripping column and sending it to the column for separating carbon monoxide and methane, at least a portion of the vessel liquid of the separation column constituting the methane-enriched liquid, and a pipe for drawing off a carbon monoxide-enriched fluid from the top of the separation column, a pipe for sending a carbon monoxide-enriched fluid as coolant fluid for cooling at least one fluid drawn off at an intermediate level of the scrubbing column in a second heat exchanger, characterized in that the fluid which serves to cool the at least one fluid drawn off at an intermediate level of the scrubbing column is at a pressure greater than that of the top of the separation column, characterized in that it comprises means for sending the fluid having served to cool the at least one fluid drawn off at an intermediate level of the scrubbing column, at a pressure greater than that of the top of the separation column, to an intermediate level of the centrifugal compressor.

The plant comprises means connecting the centrifugal compressor to the separation column and may comprise means for sending the carbon monoxide-enriched gas originating from the separation column to the centrifugal compressor in order to pressurize this gas such that it can serve as product and cycle gas. The compressor may be connected to the second heat exchanger via an expansion valve.

The plant may comprise a volume of liquid carbon monoxide at the column top.

The plant may comprise means to recover a portion of the vessel liquid from the separation column as methane-rich product in liquid form.

The plant may comprise means to recover a portion of the vessel liquid from the separation column as methane-rich product in gaseous form, comprising means for sending the portion to be vaporized in the heat exchanger, optionally after having been pressurized.

The plant may comprise means for reducing in pressure the gas originating from the centrifugal compressor in order to serve as coolant fluid for the at least one fluid drawn off at an intermediate level of the scrubbing column.

The plant may comprise means for sending a fluid from the top of the separation column to the second heat exchanger as coolant fluid.

The plant may comprise means for sending a fluid from a volume located at the top of the separation column to the second heat exchanger as coolant fluid.

The invention proposes reducing the pressure required for the cycle in order to increase the volumetric flow rate at the outlet of the compressor and thus be able to use centrifugal technology instead of piston technology.

Thus, by operating the $CO/CH_4$ column at 1.6 bar abs, 22 bar abs of cycle pressure is required, no longer 28 bar abs.

However, it is required to maintain the pressure of the CO which cools the methane scrubbing column at 2.6 bar abs. There are therefore two CO cycle circuits, 2.6 bar abs and 1.6 bar abs.

In the case in which it is required to produce oxogas at a higher pressure than the pressure of the synthesis gas at the cold box inlet, having a CO cycle at 22 bar instead of 28 bar abs also makes it possible to reduce the total energy.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims the way in which said claims refer back to one another.

DETAILED DESCRIPTION OF THE INVENTION

Figure 1:
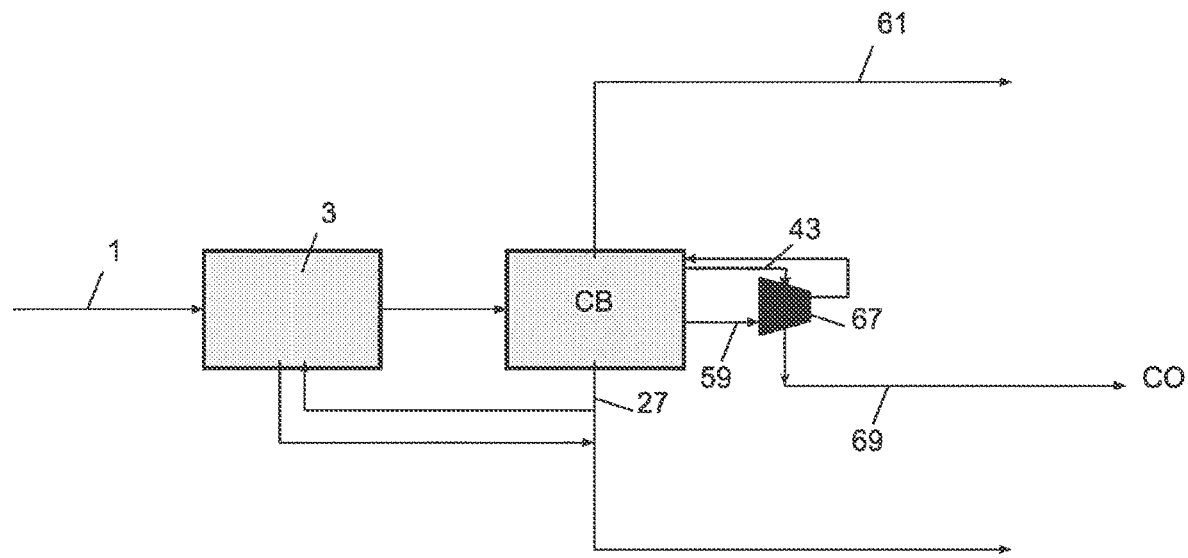
FIG. 1 provides a first embodiment of the present invention.
Figure 2:
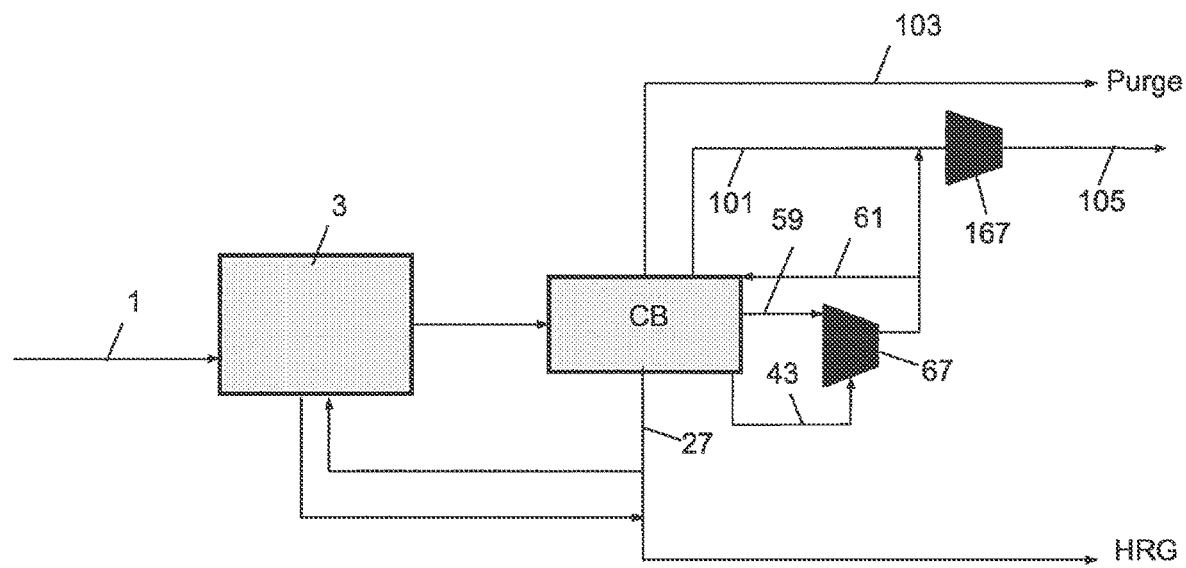
FIG. 2 provides a second embodiment of the present invention.
Figure 3:
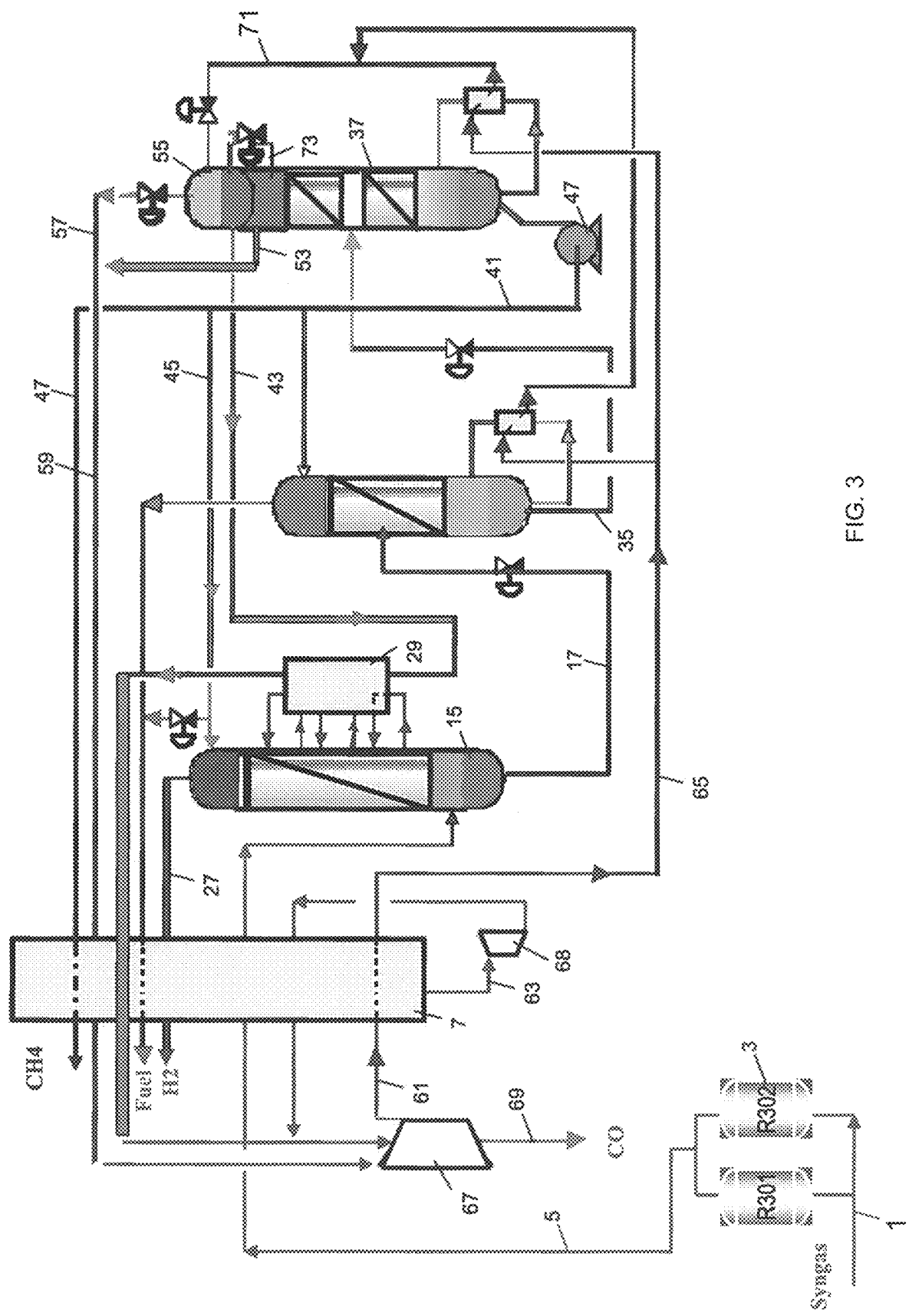
FIG. 3 provides a showing of an embodiment of the cryogenic separation in accordance with an embodiment of the present invention.
Figure 4:
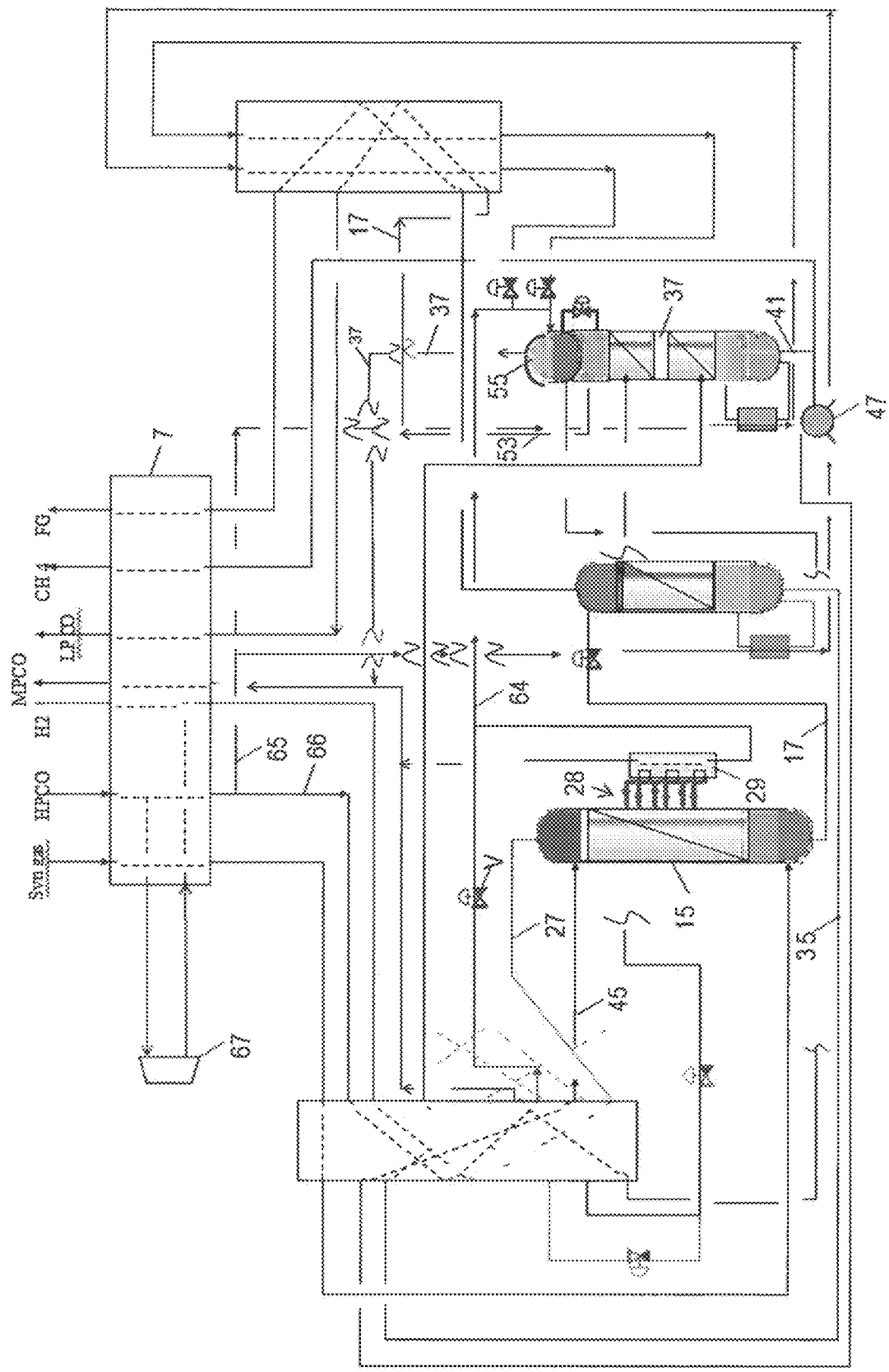
FIG. 4 provides a showing of another embodiment of the cryogenic separation in accordance with an embodiment of the present invention.

The invention will be described in more detail with reference to FIGS. 1 to 4, FIGS. 1 and 2 depicting the overall process and FIGS. 3 and 4 showing the cryogenic separation in particular.

According to the process of FIG. 1, a flow of synthesis gas at 24 bar containing at least hydrogen, carbon monoxide and methane and optionally nitrogen 1 is purified of water, carbon dioxide, methanol and other impurities in the purification unit 3 and subsequently the flow 5 of dry synthesis gas is sent to a cold box CB which is an insulated chamber containing distillation columns. A product of this system of distillation columns is a purge gas 103. Another 27 is hydrogen HRG, a portion of which serves to regenerate the purification unit. A flow of carbon monoxide 59 at 1.2 bar and another flow of carbon monoxide 43 at 2.2 bar are sent to different levels of the compressor 67 where they are compressed. The flow 43 serves to cool a flow drawn off at an intermediate level of the scrubbing column. A flow of product 69 leaves at an intermediate level of the compressor 67 at less than 22 bar. The rest of the gas is compressed up to the final stage at a pressure of 22 bar and is returned to the cold box CB as flow 61.

According to the process of FIG. 2, the process does not produce carbon monoxide but a mixture of carbon monoxide and hydrogen formed by mixing a gas 101 drawn off from the methane scrubbing column at an intermediate level containing hydrogen and carbon monoxide and a portion of the compressed gas in the final stage of the compressor 67 at 22 bar. A portion 61 of the gas at 22 bar is returned to the cold box CB and the rest 62 is compressed in a compressor 167 with the flow 101 to form a product 105 containing carbon monoxide and hydrogen at 29 bar.

According to the process of FIG. 3, a flow of synthesis gas containing at least hydrogen, carbon monoxide and methane and optionally nitrogen 1 is purified of water, carbon dioxide, methanol and other impurities in the purification unit 3 and subsequently the flow 5 of dry synthesis gas is sent to the cold box where it is cooled in the heat exchanger 7, which is preferably a brazed aluminum plate exchanger. The cooled gas is sent to the bottom of a scrubbing column 15. The scrubbing column is suppled at the top with a methane-rich liquid 45 as scrubbing liquid. A hydrogen-enriched gas 27 is drawn off as top gas from the scrubbing column 15 and a vessel liquid 17 is drawn off from the scrubbing column.

The vessel liquid 17 from the scrubbing column is sent to the middle of a stripping column 31. At least one, preferably several, intermediate liquids 28 are drawn off at intermediate levels of the scrubbing column 51 and sent to be vaporized in the heat exchanger 29. A vessel liquid 35 is drawn off from the stripping column 31 and sent at 1.6 bar to a column for separating carbon monoxide and methane 37 at an intermediate level after cooling. At least a portion 45 of the vessel liquid 41 from the separation column 37 constitutes the scrubbing liquid after pressurization in the pump 46. A carbon monoxide-rich gas 53 is drawn off at the top of the separation column 37. The separation column 37 operates at 1.6 bar and optionally comprises a volume 55 which serves as storage for liquid carbon monoxide at the column top. The gas 53 at 1.6 bar abs is mixed with the gas 57 from the volume, after having reduced in pressure the gas 57 of the volume, from the volume pressure of 2.6 bar abs to 1.6 bar abs. The mixture of the two gases 59 is heated in the exchanger 7 and sent to the inlet of a carbon monoxide compressor 67 to provide the carbon monoxide-rich product 69. A portion 61 of the carbon monoxide at 22 bar abs is cooled in the heat exchanger 7 and divided into two; one portion 63 is reduced in pressure in a turbine 68 to be heated in the exchanger 7 and returned to the compressor 57. The rest 65 at 22 bar abs serves to reboil the columns 31 and 37 and, where appropriate, to supply the volume 55. The carbon monoxide-rich gas 71 which has served to heat the vessels of the columns 31 and 37 is reduced in pressure by 22 bar abs down to the pressure of the volume which is 2.6 bar, to form a biphase flow. Carbon monoxide-enriched liquid accumulates in the volume 55 and is sent through an expansion valve at the top of the separation column through a pipe 73 to reduce in pressure the liquid from 2.6 bar to 1.6 bar, the pressure of the top of the separation column 37.

There are therefore two CO cycle circuits, 2.6 bar abs and 1.6 bar abs.

Liquid carbon monoxide 43 from the storage 55 after reduction in pressure serves to cool the intermediate fluids 28 from the scrubbing column 15 at a point below the inlet of the scrubbing liquid. Otherwise, the liquid carbon monoxide 43 may be taken at the top of the $CO/CH_4$ column 37 and sent to the heat exchanger 29 to cool the intermediate fluids 28.

A gas 33 leaves the top of the stripping column 31 and a methane-rich product 47 is optionally drawn off from the $CO/CH_4$ column 37 in liquid form and vaporized in the exchanger 7.

The gas 33 is mixed with a portion of the methane 45 after reduction in pressure of the latter in a valve. The mixture thus formed is heated and may serve as fuel.

The gas 43 which has served to cool the intermediate drawing-offs 28 from the scrubbing column is sent at 2.6 bar to an intermediate level of the compressor 67.

The carbon monoxide-enriched gas 69 serves as product, optionally mixed with another product to form oxogas.

The pressure difference between the fluid 43 serving to cool at least one intermediate fluid from the scrubbing column 15 and that of the top of the separation column 37 is at least 0.5 bar, or even at least 0.9 bar.

As an alternative, as illustrated in FIG. 4, a portion 66 of the gas 61 or 69 compressed in the compressor 67 (not illustrated) may be reduced in pressure in a valve V to serve as coolant fluid for at least one fluid 28 drawn off at an intermediate level of the scrubbing column 15 in the exchanger 29. Even after reduction in pressure, this fluid 66 will be at a pressure greater than that of the top of the separation column 37 by at least 0.5 bar, or even at least 0.9 bar.

The fluid 66 cooled in the heat exchanger 29 is subsequently sent as gas 43 to the compressor 67 at an intermediate level of the latter. It is mixed with the gas 37 originating from the volume 55 and with the vaporized liquid originating from the volume 55.

Another portion 64 of the fluid reduced in pressure in the valve V is sent to the volume 55 or simply to the top of the column 37 if there is no volume 55.

The gas 53, 59 originating from the top of the $CO/CH_4$ column and at lower pressure than the flow 43 is sent to the inlet of the compressor 67.

The gas 39 produced in the volume 55 mixes with the gas having served to heat the exchanger 29 and is returned to the compressor like the gas 43.

In this variant, the methane produced 47 has not been pressurized in the pump 46 before being vaporized in the exchanger 7.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for a combined production of i) a hydrogen-enriched gas and a carbon monoxide-enriched gas and/or ii) a mixture of hydrogen and carbon monoxide by cryogenic distillation and scrubbing, the process comprising the steps of:
   a. cooling a gaseous mixture comprising hydrogen, carbon monoxide, and methane in a heat exchanger to form a cooled mixture;
   b. sending the cooled mixture to a scrubbing column;
   c. introducing a methane-rich liquid into the scrubbing column as scrubbing liquid;
   d. withdrawing a hydrogen-enriched gas from the scrubbing column;
   e. withdrawing a first vessel liquid from the scrubbing column and sending said first vessel liquid to a stripping column;
   f. withdrawing a second vessel liquid from the stripping column and sending the second vessel liquid to a separation column that is configured to separate carbon monoxide and methane;
   g. withdrawing a first carbon monoxide-rich fluid from a volume located above a top of the separation column;
   h. withdrawing a second carbon monoxide-rich fluid from the volume located above the top of the separation column;
   i. expanding the second carbon monoxide-rich fluid to an expanded pressure ($P_E$) and then warming the second carbon monoxide-rich fluid in the heat exchanger to form an expanded carbon monoxide gas;
   j. introducing the expanded carbon monoxide gas into an inlet stage of a centrifugal compressor; and
   k. using the first carbon monoxide-rich fluid as coolant fluid for cooling at least one fluid drawn off at an intermediate level of the scrubbing column,
   wherein at least a portion of a third vessel liquid from the separation column constitutes the methane-rich liquid of the step c,
   wherein the coolant fluid is at a greater pressure than that of the top of the separation column and the expanded pressure ($P_E$), and in that the coolant fluid, after having served to cool the at least one fluid drawn off at the intermediate level of the scrubbing column, is sent to an intermediate stage of the centrifugal compressor at a pressure exceeding the expanded pressure ($P_E$) in order to be compressed therein, such that the coolant fluid and the expanded carbon monoxide gas are introduced at different stages of the centrifugal compressor with the inlet stage being at a lower pressure than the intermediate stage.

2. The process as claimed in claim 1, wherein a liquid from the volume located above the top of the separation column is reduced in pressure and sent to the separation column.

3. The process as claimed in claim 1, wherein a pressure difference between the coolant fluid and that of the top of the separation column is at least 0.5 bar.

4. The process as claimed in claim 1, wherein a pressure difference between the coolant fluid and that of the top of the separation column is at least 0.9 bar.

5. The process as claimed in claim 1, wherein a portion of the third vessel liquid from the separation column is recovered as methane-rich product in liquid form or, after having been vaporized in the heat exchanger, in gaseous form.

6. The process as claimed in claim 1, wherein a carbon monoxide-enriched gas provides reboiling duty for the stripping column and/or the separation column and is sent to the volume above the top of the separation column after reduction in pressure in a valve.

7. The process as claimed in claim 1, wherein at least a portion of a carbon monoxide-rich liquid from the volume located above the top of the separation column is reduced in pressure and sent to the top of the separation column to be vaporized on contact with vapor rising inside the separation column and is subsequently mixed with a portion of a top gas of the separation column.

8. The process as claimed in claim 1, wherein the separation column is operated at 1.6 bar.

9. The process as claimed in claim 1, wherein a gas from the top of the separation column is sent to the inlet stage of the centrifugal compressor.

10. The process as claimed in claim 1, wherein a carbon monoxide cycle comprising CO cycle gas is used to heat the stripping column and the separation column and to cool the top of the separation column, the centrifugal compressor serving to compress the CO cycle gas.

11. A process for a combined production of i) a hydrogen-enriched gas and a carbon monoxide-enriched gas and/or ii) a mixture of hydrogen and carbon monoxide by cryogenic distillation and scrubbing, the process comprising the steps of:
   a. cooling a gaseous mixture comprising hydrogen, carbon monoxide, and methane in a heat exchanger to form a cooled mixture;
   b. sending the cooled mixture to a scrubbing column;
   c. introducing a methane-rich liquid into the scrubbing column as a scrubbing liquid;
   d. withdrawing a hydrogen-enriched gas from the scrubbing column;
   e. withdrawing a first vessel liquid from the scrubbing column and sending said first vessel liquid to a stripping column;
   f. withdrawing a second vessel liquid from the stripping column and sending the second vessel liquid to a separation column that is configured to separate carbon monoxide and methane; and g. withdrawing a first carbon monoxide-rich fluid from a volume located above a top of the separation column;

h. using the first carbon monoxide-rich fluid as a coolant fluid for cooling at least one fluid drawn off at an intermediate level of the scrubbing column; and i. cooling a carbon monoxide stream in the heat exchanger and then introducing the carbon monoxide stream into an inlet stage of the centrifugal compressor, the carbon monoxide stream being at a first pressure, wherein the carbon monoxide stream is comprised of carbon monoxide sourced from a location selected from the group consisting of the top of the separation column, the volume located above the top of the separation column, and combinations thereof, wherein at least a portion of a third vessel liquid from the separation column constitutes the methane-rich liquid of the step c, wherein the coolant fluid is at a greater pressure than that of the top of the separation column and the first pressure, and in that the coolant fluid, after having served to cool the at least one fluid drawn off at the intermediate level of the scrubbing column, is sent to an intermediate stage of the centrifugal compressor at a pressure exceeding the first pressure in order to be compressed therein, such that the coolant fluid and the carbon monoxide stream are introduced at different stages of the centrifugal compressor with the inlet stage being at a lower pressure than the intermediate stage.

* * * * *